(12) United States Patent
Eijsbouts-Spickova et al.

(10) Patent No.: US 9,364,816 B2
(45) Date of Patent: Jun. 14, 2016

(54) CONCENTRATED SOLUTIONS COMPRISING GROUP VI METAL, GROUP VIII METAL, AND PHOSPHORUS

(75) Inventors: Sona Eijsbouts-Spickova, Nieuwkujik (NL); Marcel Adriaan Jansen, Nieuw Vennep (NL)

(73) Assignee: Albemarle Europe SPRL (BE)

( * ) Notice: Subject to any disclaimer, the term of this patent is extended or adjusted under 35 U.S.C. 154(b) by 1078 days.

(21) Appl. No.: 13/394,971

(22) PCT Filed: Aug. 24, 2010

(86) PCT No.: PCT/EP2010/062283
§ 371 (c)(1),
(2), (4) Date: Mar. 8, 2012

(87) PCT Pub. No.: WO2011/029716
PCT Pub. Date: Mar. 17, 2011

(65) Prior Publication Data
US 2012/0168347 A1   Jul. 5, 2012

Related U.S. Application Data

(60) Provisional application No. 61/241,235, filed on Sep. 10, 2009, provisional application No. 61/241,242, filed on Sep. 10, 2009.

(51) Int. Cl.
| | | |
|---|---|---|
| *B01J 27/19* | (2006.01) | |
| *B01J 27/185* | (2006.01) | |
| *B01J 37/02* | (2006.01) | |
| *B01J 23/888* | (2006.01) | |
| *B01J 23/88* | (2006.01) | |
| *B01J 37/08* | (2006.01) | |
| *C10G 49/04* | (2006.01) | |
| *C10G 45/04* | (2006.01) | |
| *C10G 45/08* | (2006.01) | |
| *B01J 27/14* | (2006.01) | |
| *B01J 27/188* | (2006.01) | |
| *B01J 37/00* | (2006.01) | |
| *B01J 37/03* | (2006.01) | |

(52) U.S. Cl.
CPC .............. *B01J 23/888* (2013.01); *B01J 23/88* (2013.01); *B01J 27/1853* (2013.01); *B01J 27/19* (2013.01); *B01J 37/0203* (2013.01); *B01J 37/0213* (2013.01); *B01J 37/0236* (2013.01); *B01J 37/08* (2013.01); *C10G 45/04* (2013.01); *C10G 45/08* (2013.01); *C10G 49/04* (2013.01)

(58) Field of Classification Search
CPC ...... B01J 27/14; B01J 27/185; B01J 27/1853; B01J 27/1856; B01J 27/188; B01J 27/19; B01J 37/00; B01J 37/02; B01J 37/0236; B01J 37/03; B01J 37/031; B01J 37/036; B01J 37/038

See application file for complete search history.

(56) References Cited

U.S. PATENT DOCUMENTS

| | | |
|---|---|---|
| 3,755,196 A | 8/1973 | Mickelson |
| 4,028,227 A | 6/1977 | Gustafson |
| 4,940,533 A | 7/1990 | Simpson |
| 5,162,281 A | 11/1992 | Kamo |
| 5,164,354 A | 11/1992 | Aldridge |
| 5,232,888 A | 8/1993 | Kamo |
| 6,200,927 B1 | 3/2001 | Shukis |
| 7,361,624 B2 | 4/2008 | Fujikawa |
| 2002/0010086 A1 | 1/2002 | Plantenga |
| 2003/0183556 A1 | 10/2003 | Halbert |
| 2004/0186013 A1 * | 9/2004 | Iwata et al. .............. 502/208 |
| 2005/0109674 A1 | 5/2005 | Klein |
| 2006/0237345 A1 | 10/2006 | Bhan |
| 2007/0135300 A1 | 6/2007 | Kagami |
| 2010/0243530 A1 * | 9/2010 | Marchand et al. .......... 208/141 |

FOREIGN PATENT DOCUMENTS

| | | | |
|---|---|---|---|
| CA | 2302969 A1 | 10/2000 | |
| CN | 1172692 A | 2/1998 | |
| EP | 0601722 A1 | 6/1994 | |
| EP | 1772189 A1 | 4/2007 | |
| FR | 2917647 * | 12/2008 | ............... B01J 37/02 |
| WO | WO-01/02092 A1 | 1/2001 | |
| WO | WO-2005/051539 A1 | 6/2005 | |

OTHER PUBLICATIONS

Bergwerff, Jacob Arie. "Spatially Resolved Spectroscopy on the Preparation of CoMo/Al2O3 Hydrodesulphurization Catalysts." Utrecht University, The Netherlands, 2007.
Pope, Michael Thor. "Heteropoly and Isopoly Oxometallates," Springer Verlag, New York, 1983. Chapter 4.B.III.
Tsigdinos, G. "Heteropoly Compounds of Molybdenum and Tungsten," Topics in Current Chemistry, 1978, 76, 1.

* cited by examiner

*Primary Examiner* — Brian McCaig
(74) *Attorney, Agent, or Firm* — Nathan C. Dunn; Jeremy J. Kliebert

(57) ABSTRACT

This invention provides processes for forming solution compositions, which processes comprises bringing together, in an aqueous medium, i) at least one phosphorus compound; ii) at least one Group VI metal compound; and iii) at least one Group VIII metal compound, such that a solution having a Group VI metal concentration of more than about 5.6 mol/L is formed. Also provided are compositions formed by such processes, processes for forming catalyst compositions from these compositions, and catalyst compositions formed by these processes.

24 Claims, No Drawings

CONCENTRATED SOLUTIONS COMPRISING GROUP VI METAL, GROUP VIII METAL, AND PHOSPHORUS

PRIORITY CLAIM

This application is a 371 of PCT/EP 10/062283 filed on Aug. 24, 2010, which claims priority to Provisional Patent Application Nos. 61/241,235 and 61/241,242 filed Sep. 10, 2009, the disclosure of which is herein incorporated by reference in its entirety.

TECHNICAL FIELD

This invention relates to concentrated solutions comprising a Group VI metal, a Group VIII metal, and phosphorus, and to catalysts made from such solutions.

BACKGROUND

A variety of catalysts for hydrotreating, hydrodesulfurization, and/or hydrodenitrogenation are known and/or are commercially available. Some of these catalysts contain molybdenum, nickel or cobalt, and phosphorus. Some impregnation solutions from which such catalysts are made have molybdenum present in concentrations up to about 550 g/L (expressed as $MoO_3$), i.e., about 3.8 mol/L. In this connection, U.S. Pat. No. 7,361,624 discloses catalysts in which the loading is such that the Group VI metal (as its trioxide) is 10 to 30 wt % of the catalyst. U.S. Pat. No. 5,164,354 suggests that catalyst having 5 to 50 wt % Group VI metal on the support can be prepared; in Example I therein, two impregnation steps were needed to achieve 26.2 wt % molybdenum on the support. Impregnation solutions having 45 to 80 grams of molybdenum trioxide, 8 to 20 grams of nickel oxide, and zero to 15 grams of cobalt oxide in 100 mL of solution have been reported in CN 1172692. Because these types of catalysts are usually prepared by pore volume impregnation, the amount of hydrogenation metals in solution determines the amount of hydrogenation metals on the support. To increase the loading of hydrogenation metals on the support, multiple sequential impregnation steps are usually employed. Impregnation solutions having higher concentrations of hydrogenation metals are desired, so that catalysts with higher loadings can be prepared in a single impregnation step.

SUMMARY OF THE INVENTION

This invention provides solutions comprising Group VI metal, Group VIII metal, and phosphorus, which solutions have higher concentrations of at least the Group VI metal than previously achieved, while still having the properties of an impregnation solution (e.g., the solution can sufficiently impregnate the support, and the catalyst components do not adhere to the impregnation solution's container). Also provided by this invention are processes for forming such concentrated solutions, and catalysts made from such concentrated solutions.

An embodiment of this invention is a process for forming a solution composition, which process comprises bringing together, in an aqueous medium,
i) at least one phosphorus compound;
ii) at least one Group VI metal compound; and
iii) at least one Group VIII metal compound,
such that a solution having a phosphorus concentration in the range of from about 0.40 to about 1.7 mol/l and a P:Group VI molar ratio of from about 1:6 to about 1:12 is formed.

Another embodiment of this invention is a process for forming a solution composition, which process comprises bringing together, in an aqueous medium,
i) at least one phosphorus compound;
ii) at least one Group VI metal compound; and
iii) at least one Group VIII metal compound,
such that a solution having a Group VI metal concentration of more than 6.9 mol/L, a phosphorus concentration in the range of from about 1.1 to about 3.3 mol/l and a P:Group VI molar ratio of from about 1:3 to about 1:6 is formed.

Another embodiment of this invention is a process for forming a solution composition, which process comprises bringing together, in an aqueous medium,
i) at least one phosphorus compound;
ii) at least one Group VI metal compound; and
iii) at least one Group VIII metal compound,
such that a solution having a Group VI metal concentration of more than 6.9 mol/L, a phosphorus concentration in the range of from about 2.2 to about 6 mol/l and a P:Group VI molar ratio of from about 1:1 to about 1:3 is formed.

In another embodiment, the present invention relates to a process for forming a solution composition, which process comprises bringing together, in an aqueous medium,
i) at least one phosphorus compound;
ii) at least one Group VI metal compound; and
iii) at least one Group VIII metal compound,
thereby forming an aqueous solution composition comprising an aqueous medium, and components i)-iii), and removing at least a portion of the aqueous medium from said first solution such that a solution having a phosphorus concentration in the range of from about 0.5 to about 6.00 mol/l and a P:Group VI molar ratio of from about 1:1 to about 1:12 is formed.

Other embodiments of this invention relate to the solution compositions formed by the just-described processes. Still another embodiment of this invention is a process for forming a catalyst, which process comprises bringing together a carrier and an impregnation solution comprising a composition of this invention.

These and other embodiments and features of this invention will be still further apparent from the ensuing description and appended claims.

FURTHER DETAILED DESCRIPTION OF THE INVENTION

As used throughout this document, the phrases "solution composition" and "solution composition of this invention" refer to the compositions described herein as solutions comprising a Group VI metal, a Group VIII metal, and phosphorus, which solutions have a phosphorus concentration in the range of from about 0.40 to about 1.7 mol/l and a P:Group VI molar ratio of from about 1:6 to about 1:12; or those having a Group VI metal concentration of more than 6.9 mol/L, a phosphorus concentration in the range of from about 1.1 to about 3.3 mol/l and a P:Group VI molar ratio of from about 1:3 to about 1:6; or those having a Group VI metal concentration of more than 6.9 mol/L, a phosphorus concentration in the range of from about 2.2 to about 6 mol/l and a P:Group VI molar ratio of from about 1:1 to about 1:3; or those having a phosphorus concentration in the range of from about 0.5 to about 6.00 mol/l and a P:Group VI molar ratio of from about 1:1 to about 1:12.

Throughout this document, the phrases "hydrogenation metal" and "hydrogenation metals" refer to the Group VI metal or metals and the Group VIII metal or metals collectively. As used throughout this document, the term "Group VI metal" refers to the metals of Group VIB.

Processes of the invention for forming solution compositions of the invention comprise bringing together, in an aqueous medium, i) at least one phosphorus compound; ii) at least one Group VI metal compound; and iii) at least one Group VIII metal compound. The Group VI metal present in the solution compositions is molybdenum, tungsten, and/or chromium; preferably molybdenum or tungsten, more preferably molybdenum. The Group VIII metal present in the solution compositions is iron, nickel and/or cobalt, preferably nickel and/or cobalt. Preferred mixtures of metals include a combination of nickel and/or cobalt and molybdenum and/or tungsten. When hydrodesulfurisation activity of the catalyst is to be emphasized, a combination of cobalt and molybdenum is advantageous and preferred. When hydrodenitrogenation activity of the catalyst is to be emphasized, a combination of nickel and molybdenum or tungsten is advantageous and preferred. Another preferred combination of hydrogenation metals is nickel, cobalt, and molybdenum.

The Group VI metal compounds include, but are not limited to, oxides, oxo acids, and ammonium salts of an oxo or polyoxo anion; these Group VI metal compounds are formally in the +6 oxidation state when the metal is molybdenum or tungsten. Oxides and oxo-acids are preferred Group VI metal compounds. Suitable Group VI metal compounds in the practice of this invention include chromium(III) oxide, ammonium chromate, ammonium dichromate, molybdenum trioxide, molybdic acid, ammonium molybdate, ammonium para-molybdate, tungsten trioxide, tungstic acid, ammonium tungsten oxide, ammonium metatungstate hydrate, ammonium para-tungstate, and the like. Preferred Group VI metal compounds include chromium(III) oxide, molybdenum trioxide, molybdic acid, ammonium para-tungstate, tungsten trioxide and tungstic acid. Mixtures of any two or more Group VI metal compounds can be used.

The Group VIII metal compound is usually an oxide, hydroxide or a salt. Suitable Group VIII metal compounds include, but are not limited to, iron oxide, iron hydroxide, iron nitrate, iron carbonate, iron hydroxy-carbonate, iron acetate, iron citrate, cobalt oxide, cobalt hydroxide, cobalt nitrate, cobalt carbonate, cobalt hydroxy-carbonate, cobalt acetate, cobalt citrate, nickel oxide, nickel hydroxide, nickel nitrate, nickel carbonate, nickel hydroxy-carbonate, nickel acetate, and nickel citrate. Preferred Group VIII metal compounds include iron hydroxide, iron carbonate, iron hydroxy-carbonate, cobalt hydroxide, cobalt carbonate, cobalt hydroxy-carbonate, nickel hydroxide, nickel carbonate, and nickel hydroxy-carbonate. Mixtures of two or more Group VIII metal compounds can be used.

In the practice of this invention, the phosphorus compound is typically a water soluble, acidic phosphorus compound, particularly an oxygenated inorganic phosphorus-containing acid. Examples of suitable phosphorus compounds include metaphosphoric acid, pyrophosphoric acid, phosphorous acid, orthophosphoric acid, triphosphoric acid, tetraphosphoric acid, and precursors of acids of phosphorus, such as ammonium hydrogen phosphates. Mixtures of two or more phosphorus compounds can be used. The phosphorus compound may be used in liquid or solid form. A preferred phosphorus compound is orthophosphoric acid ($H_3PO_4$).

The solution compositions of the inventions, or produced by the present inventions, are solutions having a phosphorus concentration in the range of from about 0.40 to about 1.7 mol/l and a P:Group VI molar ratio of from about 1:6 to about 1:12; or those having a Group VI metal concentration of more than 6.9 mol/L, a phosphorus concentration in the range of from about 1.1 to about 3.3 mol/l and a P:Group VI molar ratio of from about 1:3 to about 1:6; or those having a Group VI metal concentration of more than 6.9 mol/L, a phosphorus concentration in the range of from about 2.2 to about 6 mol/l and a P:Group VI molar ratio of from about 1:1 to about 1:3; or those having a phosphorus concentration in the range of from about 0.5 to about 6.00 mol/l and a P:Group VI molar ratio of from about 1:1 to about 1:12. In some embodiments, the solution compositions can be further described as having a Group VI metal concentration of more than about 5.6 mol/L, preferably the Group VI metal concentration is in the range of more than about 5.6 mol/L to about 9.7 mol/L; more preferable are concentrations in the range of about 5.9 mol/L to about 9.7 mol/L, and even more preferable for the Group VI metal are concentrations in the range of about 6.9 mol/L to about 9.7 mol/L. In some embodiments, the solution compositions can be further described as having a Group VIII metal concentration in the range of about 1.12 mol/L to about 4.85 mol/L preferably the Group VIII metal compound concentrations is in the range of about 1.18 mol/L to about 4.85 mol/L; concentrations in the range of about 1.38 mol/L to about 4.85 mol/L are even more preferred.

The pH can affect the solubility of the at least one Group VI metal compound and/or the at least one Group VIII metal compound. Thus, one having ordinary skill in the art may wish to adjust the pH of the aqueous medium before or after the addition of the at least one Group VI and/or at least one Group VIII metal compound and/or at least one phosphorous compound, and/or adjust the pH of the solution composition to aid the dissolving or solubilizing of the at least one Group VI metal compound and/or the at least one Group VIII metal compound. One having ordinary skill in the art would understand and know how and when to adjust such pH. For example, the pH can be adjusted by the addition one or more optional components, described below, or through the use of inorganic acids or bases. If such pH adjustment is conducted, it is preferred to use the optional components described herein for such pH adjustments.

The inventors hereof have found that when the Group VIII metal compound used is a Co metal compound or a Co metal compound and one other Group VIII metal compound, preferably the one other Group VIII metal compound is a Ni metal compound, it is preferable to increase the amount of optional organic acid used, and/or adjust the amounts of the at least one phosphorus compound, preferably phosphoric acid based compounds, and/or include additional amounts of the at least one inorganic acid, preferably nitric acid, to aid in dissolving the metals into solution.

In some embodiments, the solution compositions can be further described as having a preferred molar ratio of the Group VI metal to the Group VIII metal in the range of from about 2:1 to about 5:1. The inventors hereof have found that when the ratio of GroupVI:GroupVIII molar ratios are within the upper end of this range, it is preferable to increase the amount of optional organic acid used, and/or adjust the amounts of the at least one phosphorus compound, preferably phosphoric acid based compounds, and/or include additional amounts of the at least one inorganic acid, preferably nitric acid, to aid in dissolving the metals into solution.

However, it must be noted that when one increases the amount of the optional organic acid, and/or includes additional amounts of the at least one phosphorus compound, preferably phosphoric acid based compounds, the viscosity of the solution composition typically increases. The increase in viscosity as well as the viscosity will vary depending on the compounds present within the solution.

For the phosphorus compound, it is preferably present in a concentration in the range of from about 0.40 to about 1.7 mol/L, more preferably from about 0.46 to about 1.7 mol/L, and even more preferably from about 0.58 to about 1.7 mol/L, in some embodiments in the range of from about 1.1 to about 3.3 mol/L, more preferably from about 1.15 to about 3.24 mol/L, in some embodiments in the range of from about 2.2 to about 6 mol/L, more preferably from about 2.2 to about 4.5 mol/L, and in some embodiments in the range of from about 0.5 to about 6.00 mol/L, more preferably from about 0.58 to about 4.5 mol/L. In some embodiments, preferred molar ratios of phosphorus to Group VI metal are from about 1:6 to about 1:12, in some embodiments from about 1:3 to about 1:6, in some embodiments from about 1:1 to about 1:3, and in some embodiments from about 1:1 to about 1:12. In these amounts, where a mixture of compounds is used, it is understood that the total amount of a particular type of compound is used in calculating the concentrations and ratios. For example, if both a molybdenum compound and a tungsten compound are used, the amount of Group VI metal refers to the total amount of molybdenum and tungsten.

Optional components that can be included in the present inventions include a non-acidic organic additive or an organic acid. For example, in some embodiments the optional components are selected from non-acidic organic additives only, and in other embodiments the optional components are selected from organic acids only. However, in preferred embodiments, the inventions of the present invention utilize or contain both a non-acidic organic additive and an organic acid.

For the non-acidic organic additive, the term "non-acidic" as used throughout this document means that no acidic carboxylic groups are present in the additive. Non-acidic organic additives normally include compounds having at least two hydroxyl groups and two to about ten carbon atoms, and the (poly)ethers of these compounds. Some preferred, non-acidic organic additives have two hydroxyl groups. Suitable types of compounds for the non-acidic organic additive include aliphatic alcohols, ethers, including ethers of aliphatic alcohols, polyethers, saccharides, including monosaccharides and disaccharides, and polysaccharides. Examples of such compounds include, but are not limited to, glycerin, trimethylol ethane, trimethylol propane, ethylene glycol, diethylene glycol, trimethylene glycol, triethylene glycol, tributylene glycol, tetraethylene glycol, tetrapentylene glycol, propylene glycol, dipropylene glycol, polyethylene glycol, ethylene glycol monobutyl ether, diethylene glycol monomethyl ether, diethylene glycol monoethyl ether, diethylene glycol monopropyl ether, diethylene glycol monobutyl ether, glucose, fructose, lactose, maltose, and saccharose. Preferred non-acidic organic additives include diethylene glycol, triethylene glycol, tetraethylene glycol, and polyethylene glycol, more preferably polyethylene glycol with a molecular weight between about 200 and about 600, especially polyethylene glycol with a molecular weight of about 200. Mixtures of two or more additives can be used, if desired.

The amount of non-acidic additive to include in the solution composition depends on the specific situation. An appropriate amount of additive usually is in the range of about 0.01 to about 3 moles of additive per mole of hydrogenation metals present in the solution composition. Preferred amounts of non-acidic additive are in the range of about 0.1 to about 0.5 moles of additive per mole of hydrogenation metals present in the solution. On a weight basis, the concentration of the non-acidic organic additive in an impregnation solution can range from about 1 g/L to about 450 g/L. Preferably, an impregnation solution contains the non-acidic organic additive in a concentration in the range of about 5 g/L to about 350 g/L, and more preferably a concentration in the range of about 10 g/L to about 300 g/L.

The optional organic acid has at least one acid group and at least one functional group selected from a hydroxyl group and an acid group. Thus, at a minimum, the organic acid has one acid group and one hydroxyl group, or two acid groups. As used herein, the term "acid group" means the —COOH moiety. The organic acid preferably has at least two carboxylic acid moieties, and preferably has at least about three carbon atoms. It is sometimes preferred that the organic acid has at least one hydroxyl group. Suitable organic acids include citric acid, gluconic acid, lactic acid, malic acid, maleic acid, malonic acid, oxalic acid, tartaric acid, and the like. Citric acid is a preferred organic acid. Mixtures of acids can be used. Amounts of organic acid are typically in the range of about 0.2 mol/L to about 2 mol/L, and preferably about 0.2 mol/L to about 1.25 mol/L.

Although the components can be combined in any order, it is recommended and preferred that one component is suspended or dissolved in the aqueous medium prior to the introduction of the other components. Preferably, the Group VIII metal compound is introduced first; more preferably, the Group VI metal compound is introduced after the Group VIII compound. The phosphorus compound may be introduced at any point, but preferably is introduced to the aqueous medium after the Group VI compound and the Group VIII compound have been introduced. When an organic acid and/or a non-acidic organic additive are included, it is preferable to add the organic acid and/or a non-acidic organic additive after at least the Group VI compound and the Group VIII compound have been introduced into the aqueous medium. Elevated temperatures are sometimes necessary to assist in the dissolution of the components, particularly the Group VI compound and the Group VIII compound. Such elevated temperatures are typically in the range of about 50° C. to about 95° C., preferably about 60° C. to about 95° C. Temperatures in excess of about 95° C. and/or elevated pressures can be applied (e.g., hydrothermal preparation), but are not required.

In some embodiments, as noted above, another way to prepare more-concentrated solutions of the invention is via removal of at least a portion of the aqueous medium, preferably by evaporation, of less-concentrated solutions having therein the necessary components. Aqueous mediums used herein are preferably water. It is sometimes necessary to prepare solutions via evaporation, particularly for solutions that are more concentrated. Solutions with a phosphorus concentration in the range of from about 0.5 to about 6.0 mol/l and a P:Group VI molar ratio of from about 1:1 to about 1:12 can be so prepared. Generally, solutions comprising greater than about 6.9 mol Group VI metal/L often, but not always, need to be formed by evaporation. Such solutions can be prepared by starting from a solution having, e.g., 6.9 mol Group VI metal/L, or if desired, can be prepared by starting from a less-concentrated solution, at the convenience of the operator. Here, the term "less-concentrated solution" means a solution having a concentration less than the final concentration, whether the initial concentration is e.g., about 1.4 mol Group VI metal/L or e.g., about 6.9 mol Group VI metal/L, though for practical reasons solutions with higher concentrations are preferred starting points.

In the processes of the invention for forming catalysts, it is recommended and preferred that all of the components in the solution be dissolved before initiating aqueous medium removal, to maximize the amount of catalytic species present in the final product, whether gel, coating, or membrane. When a component is not fully dissolved, the solution is usually digested to dissolve the remaining solids. Even when solids are not visible, digestion can be performed to ensure that all species are in solution. Typical temperatures for digestion are in the range of about 30° to about 100° C., preferably about 50° C. to about 95° C., and more preferably about 60° to about 95° C.

Aqueous medium removal is effected at least as part of the process. Methods for removing water include evaporation, application of reduced pressure, application of heat, and the like. Application of heat is preferred. Ambient pressure is also preferred. Water removal can be conducted in air; the exclusion of oxygen is unnecessary. Temperatures for the removal of the water vary, depending on the particular type of catalyst being formed, and the particular compounds used in forming the solution. Evaporation time generally is about 30 minutes to about 24 hours, on the laboratory scale. During removal of water, a small amount of precipitate may be formed.

In the practice of the present invention, if the solutions are prepared by removing at least a portion of the aqueous medium and a non-acidic organic additive is present in the aqueous solution from which the solution composition is made, the removal of at least a portion of the aqueous medium is conducted under such conditions that at least a portion of the non-acidic organic additive remains, i.e., the non-acidic organic additive is not completely removed by evaporation or decomposition. Thus, when heat is applied to effect water removal, the conditions to be applied to the solution depend to some extent on the temperature at which the particular non-acidic organic additive boils or decomposes. In these processes of the invention, any heating should be carried out under such conditions that at least 50%, preferably 70%, more preferably 90%, of the non-acidic additive that was included in the solution is still present after removal of at least a portion of the aqueous medium. It is preferred to keep as much of the non-acidic organic additive as possible during removal of the at least a portion of the aqueous medium; however, it is understood that evaporation loss of some of the additive during water removal cannot always be avoided, at least for the more volatile non-acidic organic additives. When two or more additives are used, the aqueous medium removal conditions are selected to minimize the evaporation of the more volatile additive(s).

The compositions of the invention, formed in a process as described above, are solutions comprising a Group VI metal, a Group VIII metal, and phosphorus. The concentrations of the Group VI metal, Group VIII metal, and phosphorus and the preferences therefor are as described above for the formation of these solutions. Without wishing to be bound by theory, a mixture of species is believed to be present in the solution compositions of this invention. At this time, not all of the species are well characterized. In this connection, for examples of species present in solutions containing molybdenum and phosphorus, see J. Bergwerff, Ph. D. thesis, Utrecht University, The Netherlands, 2007, Chapter 2C.

The solution compositions of this invention are generally aqueous solutions, unless otherwise stated. The solution compositions of the present invention formed by removing at least a portion of the aqueous medium can be in the form of more concentrated aqueous solution compositions fit for use in or as impregnations solutions, or can generally be described as gels, glassy solid, or powder catalysts. If the solution compositions of the present invention are in the form of gels, glassy solid, or powder catalysts, one having ordinary skill in the art will understand that Group VI metal concentrations greater than about 6.9 mol/L, sometimes greater than about 9.7 mol/L are possible, and the concentration of the various components of the final solution composition will be dependent on the initial solution composition used. In these embodiments, at least a portion of the aqueous medium can be removed to form a solution composition suitable for use in or as impregnations solutions or further amounts of aqueous medium can be removed from the aqueous solution composition, such as by is slowly dehydrating it, thereby forming a gel, which is amorphous from a crystallographic point of view. Further dehydration of the so-formed gel will yield a glassy solid; dehydration of the glassy solid will yield a powder. Removal of at least a portion of the aqueous medium is normally conducted by heating the aqueous solution composition at a temperature in the range of about 40° C. to about 100° C., more preferably in the range of about 50° C. to about 100° C. The temperature during the removal of at least a portion of the aqueous medium should not exceed about 100° C.

Solution compositions in the form of gels typically have a water content of about 18 wt % to about 26 wt %; the water content depends on the chemical composition of the gel. Once formed, further drying of the gel is not preferred. The gels obtained by the processes of this invention are normally transparent and crystallographically amorphous.

Solution compositions in the form of glassy solids typically have a water content of about 16 wt % to about 19 wt %; the water content depends on the chemical composition of the glassy solid. Glassy solids obtained by the processes of the invention are generally transparent and crystallographically amorphous.

Solution compositions in the form of powders have a water content usually lower than about 17 wt %; the water content depends on the chemical composition of the powder. It is expected that the ratios of the components in the powder are very similar to those in the solution from which the powder was formed, i.e., the molar ratio of phosphorus to Group VI metal, etc. is as described herein when discussing the aqueous solution compositions. The powders formed by the processes of this invention are usually amorphous from a crystallographic point of view. Calcination at high temperature can cause the powders to become crystalline.

In the gels, glassy solids, and powders, the ranges for water content are approximate. It is known that the amount of water molecules present in a structure vary from one compound to another. See in this connection Michael Thor Pope, *Heteropoly and Isopoly Oxometallates*, Springer Verlag, New York, 1983, Chapter 4.B.III, and G. Tsigdinos, *Heteropoly Compounds of Molybdenum and Tungsten*, Topics in Current Chemistry, 1978, 76, 1.

When mixtures of reagents are used in forming the solution compositions, as mentioned above, a mixture of species having different metals will be present in the solution. For example, if a molybdenum compound and a tungsten compound are used, the product solution will include molybdenum and tungsten. In another example, if a cobalt compound and a nickel compound are used, the product solution will include cobalt and nickel. Mixtures of reagents such that Group VI metal compounds in which the Group VI metals of the compounds are different and Group VIII metal compounds in which the Group VIII metals of the compounds are different can be used in forming the solution compositions if desired.

The concentration of the species in the solution compositions of this invention is of significance, as these concentrations allow for the formation of catalyst with higher loadings of hydrogenation metals in a single impregnation step. The solution compositions of this invention can be employed, as embodied in this invention, to form a catalyst. Concentrations in such solutions are as described above for the solution compositions of this invention.

The amount of phosphorus and hydrogenation metals on the carrier are determined by the concentrations of phosphorus, Group VI metal, and Group VIII metal in the impregnation solution and the pore volume of the carrier. Generally, low pore volumes, e.g., 0.4 mL/gram, result in lower amounts of phosphorus and hydrogenation metals on a carrier than do high pore volumes, e.g., 1 mL/gram, when a single impregnation step is employed. Thus, solutions with higher concentrations are preferred for carriers having lower pore volumes, and are needed in order to achieve a Group VI metal loading of about 30 wt % or more as $MoO_3$ when the Group VI metal is molybdenum. For example, when the pore volume of the carrier is about 0.4 mL/gram, an impregnation solution having a molybdenum concentration of about 8.42 mol/L is usually needed to form a catalyst having about 30 wt % or more molybdenum, reported as $MoO_3$ in a single impregnation step.

In some processes of the invention for forming catalysts, catalysts are formed by bringing together a carrier and an impregnation solution to form an impregnated carrier, and drying the impregnated carrier to form a catalyst. The impregnation solution comprises a solution composition of this invention. For impregnation solutions, the preferences for the solution compositions of the invention are as described above.

Throughout this document, the term "carrier" refers to a carrier which is in the solid form or is pre-shaped. Such a carrier remains predominantly in the solid form when contacted with an aqueous medium. The term does not refer to precursor salts, such as sodium aluminate, which dissolve almost completely in an aqueous medium. In embodiments where the solution compositions of the present invention are used to impregnate a carrier, the carrier may be composed of conventional oxides, e.g., alumina, silica, silica-alumina, alumina with silica-alumina dispersed therein, alumina-coated silica, silica-coated alumina, magnesia, zirconia, boria, and titania, as well as mixtures of these oxides. Suitable carriers also include transition aluminas, for example an eta, theta, or gamma alumina. Preferred carriers include silica, alumina, silica-alumina, alumina with silica-alumina dispersed therein, alumina-coated silica, and silica-coated alumina, especially alumina or alumina containing up to about 20 wt % of silica, preferably up to about 12 wt % of silica. A carrier containing a transition alumina, for example an eta, theta, or gamma alumina is particularly preferred, and a gamma-alumina carrier is most preferred.

The carrier is normally employed in a conventional manner in the form of spheres or extrudates. Examples of suitable types of extrudates have been disclosed in the literature; see for example U.S. Pat. No. 4,028,227. Highly suitable for use are cylindrical particles (which may or may not be hollow) as well as symmetrical and asymmetrical polylobed particles (2, 3 or 4 lobes). Shaped carrier particles are typically calcined at a temperature in the range of about 400° to 850° C.

The carrier's pore volume (measured via $N_2$ adsorption) generally is in the range of about 0.25 to about 1 mL/g. The specific surface area will generally be in the range of about 50 to about 400 $m^2/g$ (measured using the BET method). Generally, the carrier will have a median pore diameter in the range of about 7 to about 20 nm, as determined by $N_2$ adsorption. Preferably, at least about 60% of the total pore volume will be in the range of approximately 2 nm from the median pore diameter. The figures for the pore size distribution and the surface area given above are determined after calcination of the carrier at 500° C. for one hour. An advantage of the solution compositions of the present invention is that carriers with lower pore volumes can be impregnated and still show good catalyst activity.

Methods for impregnating the carrier are known to the skilled artisan. Preferred methods include co-impregnation. In the processes of this invention for forming catalysts, only one impregnation step is needed. In the impregnation step, once the carrier and impregnation solution are brought together, the mixture is usually homogenized until virtually all of the impregnation solution is taken up into the catalyst. In this technique, which is known in the art as pore volume impregnation or as incipient wetness impregnation, the impregnation solution will be taken up virtually completely by the pores of the catalyst, which makes for an efficient use of chemicals. It should be noted that solution compositions of the present invention having higher viscosities can be effectively used to form catalysts by employing techniques within the scope of one having ordinary skill in the art. For example, more viscous impregnation solutions can be effectively used by heating the solution to decrease its viscosity, by prewetting the carrier, etc.

There can be a wide number of variations on the impregnation method. Thus, it is possible to apply a plurality of impregnating steps, the impregnating solutions to be used containing one or more of the component precursors that are to be deposited, or a portion thereof. Instead of impregnating techniques, there can be used dipping methods, spraying methods, and so forth. When carrying out multiple impregnation, dipping, etc., steps, drying and/or calcining may be carried out between impregnation steps. However, a single impregnation step is preferred because it is a faster, simpler process, and is less costly. Single impregnation also tends to provide catalysts of better quality.

Impregnation of a carrier with a solution composition of the present invention yields catalysts with higher loadings of hydrogenation metals. As described above, solutions with higher concentrations are preferred for carriers having lower pore volumes. In the catalysts of this invention, when the Group VI metal is molybdenum, it will usually be present in an amount of about 50 wt % or less, preferably in an amount of about 30 to about 45 wt %, more preferably in an amount of about 35 to about 45 wt %, calculated as molybdenum trioxide. When the Group VI metal is tungsten, it will usually be present in an amount of about 60 wt % or less, calculated as tungsten trioxide. The Group VIII metal will usually be present in an amount of 3 to about 13 wt %, preferably about 3.5 to about 10 wt %, calculated as a monoxide. Phosphorus is usually present in an amount of about 1 to about 10 wt %, preferably about 1.5 to about 9 wt %, more preferably about 2 to about 8 wt %, all calculated as $P_2O_5$.

As used herein, the phrases "as the Group VI metal trioxide," "reported as the Group VI metal trioxide," "calculated as the Group VI metal trioxide," and analogous phrases for the Group VIII metals as their monoxides and phosphorus as phosphorus pentoxide ($P_2O_5$) refer to the amount of Group VI metal, Group VIII metal, or phosphorus, where the numerical value is for the respective oxide, unless otherwise noted. For example, nickel carbonate may be used, but the amount of nickel in the catalyst is stated as the value for nickel oxide.

After the impregnation step, the impregnated carrier is normally dried to remove the solvent (usually water). The drying step may be carried out in air, under vacuum, or in the presence of an inert gas. Generally, a drying temperature below about 220° C. is recommended. The impregnated carrier (after optional drying, if carried out) is optionally calcined at a temperature in the range of about 220° to about 750°

C., preferably about 350° to about 650° C., more preferably at a temperature in the range of about 220° to about 500° C.

When a non-acidic organic additive is present in the impregnation solution, drying of the impregnated carrier is conducted under such conditions that at least a portion of the non-acidic organic additive remains in the catalyst, i.e., the non-acidic organic additive is not completely removed by evaporation or decomposition. Thus, the drying conditions to be applied depend on the temperature at which the particular non-acidic organic additive boils or decomposes; decomposition can include combustion when the drying is conducted in the presence of oxygen. In these processes of the invention, the drying step should be carried out under such conditions that at least about 50%, preferably at least about 70%, more preferably at least about 90%, of the additive which was incorporated into the catalyst in the impregnation step is still present in the catalyst after the drying step. It is preferred to keep as much of the non-acidic organic additive as possible in the catalyst during the drying step; however, it is understood that evaporation of some of the additive during the drying step cannot always be avoided, at least for the more volatile non-acidic organic additives. A drying temperature below about 220° C. may be necessary, depending on the additive. When two or more additives are used, the drying conditions are selected to minimize the evaporation of the more volatile additive(s).

In some embodiments, the gels, glassy solid, or powder, preferably powders, solution compositions of the present invention are used directly as catalysts herein. However, in some embodiments of the present invention, preferably when the solution composition is a gel, glassy solid, or powder, the solution compositions of the present invention are used to form catalysts comprising catalytic coatings and/or membranes on a substrate. While catalytic coatings and membranes can be made from more dilute solutions, less concentrated solutions may result in a thinner coating or membrane. Also, catalytic coatings and membranes formed from less concentrated solutions may not adhere properly to the substrate. Thus, solutions having a Group VI metal concentration of about 6.9 mol/L or more are preferred for forming catalytic coatings and membranes. In these embodiments, solution compositions of the present invention having higher viscosities can be effectively used to form catalysts by employing techniques within the scope of one having ordinary skill in the art. For example, more viscous impregnation solutions can be effectively used by heating the solution to decrease its viscosity, by prewetting the support, etc.

When forming catalytic coatings or membranes, a substrate and a solution composition of the present invention are brought into contact. Once the solution composition and the substrate have been brought into contact, at least a portion of the aqueous medium, which is preferably water, is removed from the solution, to form a layer on the carrier; the layer is a coating or membrane. One method for forming a coating or membrane is via spin-coating of the solution composition onto the substrate. Aqueous medium removal can be accomplished in many different ways, including drying at ambient temperature under vacuum, or by heating at temperatures up to about 120° C., although heating at higher temperature is in principle possible as long as the layer formed adheres to the substrate. If water removal is accomplished by evaporation, the evaporation can be stopped as soon as the gel that forms is immobilized on the substrate. Preferred temperatures during aqueous medium removal via heat are in the range of about 40° C. to about 95° C., more preferably in the range of about 50° C. to about 80° C. Temperatures should not exceed about 400° C. to avoid decompositions of the catalyst. Optionally, the layer formed on the substrate can be separated from the substrate.

One of the advantages of this embodiment of the present invention is that to achieve a catalytically effective loading on the substrate, the contacting of the substrate and the solution composition only needs to be done once.

Some surface roughness of the substrate can be desirable for making textured surfaces, which will have a greater surface area available for catalysis. A substrate with a rough surface or a surface with functional groups will facilitate adhesion of the layer to the substrate. Similarly, a substrate with a relatively smooth surface or a surface without functional groups thereon will facilitate removal of the layer from the substrate.

Suitable substrates in the practice of this invention include fused silica wafers, monoliths which are typically made of cordierite, ceramic, glass, metal, clays, alumina, silica, silica-alumina, alumina with silica-alumina dispersed therein, alumina-coated silica, silica-coated alumina, magnesia, zirconia, boria, titania, and the like. Another substrate is a stainless steel dish which has a fine grit bottom, in which the aqueous solution is placed; in this way textured membranes are formed.

Coatings formed by spin-coating onto fused silica wafers or monoliths are expected to have thicknesses of about 10 to about 1000 nm.

Catalytic membranes are typically comprised of several layers (support+intermediate layers+top layer). The support layer is normally several millimeters thick. The intermediate layers are usually about 5 to about 50 micrometers thick. The top layer (the catalytically active layer) is generally a few microns in thickness, and is typically mesoporous.

Catalytic coatings and catalytic membranes of this invention comprise phosphorus, one or more Group VI metals, and one or more Group VIII metals; it is expected that the ratios thereof are very similar to those in the solution composition from which the coating or membrane was made. For the catalytic coatings and catalytic membranes formed by the processes of this invention, the surface area varies widely, depending on the nature of the substrate. Similarly, the thickness of the coating or membrane depends on the nature of the substrate and the concentrations in the solution from which the coating was made. It is recommended and preferred that the catalytic coatings and membranes of this invention are not dried at high temperatures after their formation.

Optionally, catalysts of the invention may be subjected to a sulfidation step (treatment) to convert the metal components to their sulfides. In the context of the present specification, the phrases "sulfiding step" and "sulfidation step" are meant to include any process step in which a sulfur-containing compound is added to the catalyst composition and in which at least a portion of the hydrogenation metal components present in the catalyst is converted into the sulfidic form, either directly or after an activation treatment with hydrogen. Suitable sulfidation processes are known in the art. The sulfidation step can take place ex situ to the reactor in which the catalyst is to be used in hydrotreating hydrocarbon feeds, in situ, or in a combination of ex situ and in situ to the reactor.

Ex situ sulfidation processes take place outside the reactor in which the catalyst is to be used in hydrotreating hydrocarbon feeds. In such a process, the catalyst is contacted with a sulfur compound, e.g., an organic or inorganic polysulfide or elemental sulfur, outside the reactor and, if necessary, dried. In a second step, the material is treated with hydrogen gas at elevated temperature in the reactor, optionally in the presence of a feed, to activate the catalyst, i.e., to bring the catalyst into the sulfided state.

In situ sulfidation processes take place in the reactor in which the catalyst is to be used in hydrotreating hydrocarbon feeds. Here, the catalyst is contacted in the reactor at elevated temperature with a hydrogen gas stream mixed with a sulphiding agent, such as hydrogen sulfide or a compound that under the prevailing conditions is decomposable into hydrogen sulphide. It is also possible to use a hydrogen gas stream combined with a hydrocarbon feed comprising a sulfur compound that under the prevailing conditions is decomposable into hydrogen sulfide. In the latter case, it is possible to sulfide the catalyst by contacting it with a hydrocarbon feed comprising an added sulfiding agent such as dimethyldisulfide (spiked hydrocarbon feed), and it is also possible to use a sulfur-containing hydrocarbon feed without any added sulfiding agent, since the sulfur components present in the feed will be converted into hydrogen sulfide in the presence of the catalyst. Combinations of the various sulfiding techniques may also be applied. The use of a spiked hydrocarbon feed may be preferred.

The catalyst compositions of this invention are those produced by the above-described process, whether or not the process included an optional sulfiding step.

The catalyst compositions of this invention can be used in the hydroprocessing, especially hydrotreating, hydrodenitrogenation, and/or hydrodesulfurization of a wide range of hydrocarbon feeds. Examples of suitable feeds include middle distillates, kero, naphtha, vacuum gas oils, heavy gas oils, and the like.

Methods of the invention are methods for hydrotreating, hydrodenitrogenation, and/or hydrodesulfurization of a hydrocarbon feed, which methods comprise contacting a hydrocarbon feed and a catalyst of the invention. Hydrotreating of hydrocarbon feeds involves treating the feed with hydrogen in the presence of a catalyst composition of the invention at hydrotreating conditions.

Conventional hydrotreating process conditions, such as temperatures in the range of about 250° to about 450° C., reactor inlet hydrogen partial pressures in the range of about 5 to about 250 bar, space velocities in the range of about 0.1 to about 10 vol./vol.hr, and $H_2$/feed ratios in the range of about 50 to about 2000 NL/L, can be applied.

The following examples are presented for purposes of illustration, and are not intended to impose limitations on the scope of this invention.

In the following Examples, the $H_2O$ method for determining pore volume is generally as follows:
Weigh, to the nearest 0.1 g, 10 g of a prepared sample into a bottle.
Add from a burette, in 3 roughly equal portions, a total amount of water which is expected to fill about 90% of the estimated pore volume.
After each addition of water, stopper the bottle, cool the bottle to ambient temperature (cooling bath may be necessary), and shake bottle.
Continue adding water in 0.2 mL increments. After each addition, stopper the bottle and shake bottle carefully. Rotate the bottle around its axis. When part of the extrudates starts to stick to the wall of the bottle, the endpoint of the titration has been reached.
Allow the bottle to stand for 5 minutes. Shake again and rotate; if part of the extrudates still sticks to the wall, the endpoint is final; if not, continue the addition of water in 0.2 mL increments.
Finally, read the volume of water added from the burette.

The catalysts made in the Examples below were subjected to Ultra Low Sulfur Diesel (ULSD) testing in an upflow tubular reactor. Each reactor tube contained 10 mL of catalyst mixed with an equal amount of SiC particles, sandwiched between layers of SiC particles.

Before being tested, the catalysts were presulfided via liquid phase presulfiding using a feed that had been spiked with dimethyl disulfide to a total sulfur content of 3.7 wt %. The presulfided catalysts were then tested in the hydrotreating of a diesel feedstock having the properties shown in Table 1.

TABLE 1

| Type | | Light Gas Oil |
|---|---|---|
| Sulfur content | % wt | 1.1969 |
| Nitrogen content | ppmwt | 102 |
| Saturates | % wt | 71.7 |
| Mono aromatics | % wt | 16.5 |
| Di aromatics | % wt | 11.0 |
| Di+ aromatics | % wt | 0.8 |
| Polynuclear aromatics | % wt | 11.8 |
| Total Aromatic | % wt | 28.3 |
| ASTM Distillation | | |
| IBP | ° C. | 178.4 |
| V05 | ° C. | 211.1 |
| V10 | ° C. | 224.0 |
| V30 | ° C. | 261.4 |
| V50 | ° C. | 283.8 |
| V70 | ° C. | 309.3 |
| V90 | ° C. | 347.8 |
| FBP | ° C. | 372.0 |

After the presulfiding, the catalysts were tested under the conditions shown in Table 2.

TABLE 2

| | Presulfiding | Condition 1 |
|---|---|---|
| Temperature (° C.) | 320 | 320 |
| Pressure (bar) | 40 | 45 |
| H2 to oil ratio (NL/L) | 300 | 300 |
| LHSV (1/h) | 3.00 | 1.50 |

EXAMPLE 1

In a flask, a solution was prepared by adding just enough water to $CoCO_3$ powder (46 wt % Co in $CoCO_3$, 96.88 g) to make a stirrable suspension. $H_3PO_4$ (aq., 85%, 39.12 g) was then added to the suspension, followed by about 40% of the $MoO_3$ (100% $MoO_3$, total amount of $MoO_3$: 340 g). The suspension was then heated at 92° C. until the suspension became more stirrable, then the remaining $MoO_3$ was added stepwise. After about 30 minutes at 92° C., a clear solution was obtained. The concentrations of the resulting solution were 850 g $MoO_3$/L (~5.90 mol Mo/L), 142 g CoO/L (~1.89 mol Co/L), and 60.2 g $P_2O_5$/L (~0.85 mol P/L).

EXAMPLE 2

Another solution was prepared as described in Example 1, except that $NiCO_3$ was used instead of $CoCO_3$. The amounts of reagents were the same as those in Example 1, so the concentrations were the same as those obtained in Example 1 (except that the concentration of nickel was 142 g NiO/L (~1.89 mol Ni/L), and there was no cobalt in this solution).

An aliquot (4 mL) of this solution was removed into another flask, where the solution volume was slowly reduced by evaporation at 60° C. The evaporating solution was periodically weighed, and its volume was recorded. The highest molybdenum concentration obtained was about 9.7 mol $MoO_3$/L; the solution was still liquid. The data are summarized in Table 3; the molybdenum concentration is reported as g $MoO_3$/L and mol Mo/L.

TABLE 3

| Solution volume | Solution weight | Solution density | Mo concentration | Mo concentration |
|---|---|---|---|---|
| 4 mL | 7.01 g | 1.75 g/mL | 850 g/L, as $MoO_3$ | 5.9 mol Mo/L |
| 3.2 mL | 6.17 g | 1.93 g/mL | 1063 g/L, as $MoO_3$ | 7.38 mol Mo/L |
| 2.6 mL | 5.6 g | 2.15 g/mL | 1308 g/L, as $MoO_3$ | 9.08 mol Mo/L |
| 2.43 mL | not measured | not measured | 1399 g/L, as $MoO_3$ | 9.72 mol Mo/L |

EXAMPLE 3

In a flask, a solution was prepared by adding just enough water to $NiCO_3$ powder (49 wt % Ni in $NiCO_3$, 68.43 g) to make a stirrable suspension. $H_3PO_4$ (aq., 85 wt %, 29.46 g) was then added to the suspension, followed by about 40% of the $MoO_3$ (100% $MoO_3$, total amount of $MoO_3$: 256.05 g). The suspension was then heated at 92° C. until the suspension became more stirrable, then the remaining $MoO_3$ was added stepwise. After about 30 minutes at 92° C., a clear solution was obtained. The concentrations of the resulting solution were 1000 g $MoO_3$/L (~6.94 mol Mo/L), 166.7 g NiO/L (~2.23 mol Ni/L), and 70.8 g $P_2O_5$/L (~1.0 mol P/L).

A catalyst was formed by impregnating a gamma-$Al_2O_3$ carrier (pore volume: 0.79 mL/g (determined by $H_2O$ method); surface area: 248 m²/g) with the just-formed solution. The impregnated catalyst was then dried at 120° C. for 1.5 hours. The theoretical loading of the catalyst was: molybdenum, 42 wt % as $MoO_3$; nickel, 7 wt % as NiO; phosphorus, 3 wt % as $P_2O_5$.

This catalyst was tested in the ULSD test described above and had a relative volume activity (RVA, reaction order 1.4) HDS of 168 relative to KF-757 1.5E, a catalyst commercially available from Albemarle Catalysts BV.

EXAMPLE 4

In a flask, a solution was prepared by adding just enough water to $NiCO_3$ powder (49 wt % Ni in $NiCO_3$, 68.43 g) to make a stirrable suspension. $H_3PO_4$ (aq., 85 wt %, 29.46 g) was then added to the suspension, followed by about 40% of the $MoO_3$ (100% $MoO_3$, total amount of $MoO_3$: 256.05 g). The suspension was then heated at 92° C. until the suspension became more stirrable, then the remaining $MoO_3$ was added stepwise. After about 30 minutes at 92° C., a clear solution was obtained. After cooling down, 118.65 g diethylene glycol was added. The concentrations of the resulting solution were 815 g $MoO_3$/L (~5.66 mol Mo/L), 136 g NiO/L (~1.81 mol Ni/L), and 58 g $P_2O_5$/L (~0.82 mol P/L).

A catalyst was formed by impregnating 357 g of a gamma-$Al_2O_3$ carrier (pore volume: 0.80 mL/g (as determined by the $H_2O$ method; surface area: 203 m²/g) with the just-formed solution. The impregnated catalyst was then dried at 120° C. for 1.5 hours. The theoretical loading of the catalyst was: molybdenum, 38 wt % as $MoO_3$; nickel, 6.3 wt % as NiO; phosphorus, 2.7 wt % as $P_2O_5$.

This catalyst was tested in the ULSD test described above and had a relative volume activity (RVA, reaction order 1.4) HDS of 373 relative to KF-757 1.5E, a catalyst commercially available from Albemarle Catalysts BV.

EXAMPLE 5

In a flask, a solution was prepared by adding just enough water to $CoCO_3$ powder (45 wt % Co in $CoCO_3$, 68.43 g) to make a stirrable suspension. $H_3PO_4$ (aq., 85 wt %, 29.46 g) was then added to the suspension, followed by about 40% of the $MoO_3$ (100% $MoO_3$, total amount of $MoO_3$: 256.05 g). The suspension was then heated at 92° C. until the suspension became more stirrable, then the remaining $MoO_3$ was added stepwise. After about 30 minutes at 92° C., a clear solution was obtained. The concentrations of the resulting solution were 815 g $MoO_3$/L (~5.66 mol Mo/L), 136 g CoO/L (~1.81 mol Co/L), and 58 g $P_2O_5$/L (~0.82 mol P/L).

A catalyst was formed by impregnating 357 g of a gamma-$Al_2O_3$ carrier (pore volume: 0.82 mL/g (as determined by $H_2O$ method; surface area: 289 m²/g) with the just-formed solution. The impregnated catalyst was then dried at 120° C. for 1.5 hours. The theoretical loading of the catalyst was: molybdenum, 38 wt % as $MoO_3$; cobalt, 6.3 wt % as CoO; phosphorus, 2.7 wt % as $P_2O_5$.

This catalyst was tested in the ULSD test described above and had a relative volume activity (RVA, reaction order 1.4) HDS of 152 relative to KF-757 1.5E, a catalyst commercially available from Albemarle Catalysts BV.

EXAMPLE 6

In 1 liter glass container, a solution was prepared by adding just enough water (ca. 300 cc) to $NiCO_3$ powder (49.08 wt % Ni in $NiCO_3$, 135.5 g) to make a stirrable suspension. $H_3PO_4$ (aq., 85 wt %, 37.12 g) was then added to the suspension, followed by $MoO_3$ (100% $MoO_3$, 507.6 g) while stirring. The suspension was then heated to 92° C. and kept at 92° C. for about 1 hour while stirring. A clear solution was obtained. The final volume of the solution was ca. 454 cc. The concentrations of the resulting solution were 1120 g $MoO_3$/L (~7.78 mol Mo/L), 187.4 g NiO/L (~2.50 mol Ni/L), and 50.4 g $P_2O_5$/L (~0.71 mol P/L).

EXAMPLE 7

150 g (~ca. 70.67 cc) of solution described in Example 6 was placed in 100 cc glass container with a lid and heated to 80° C. while stirring. $H_3PO_4$ (aq., 85 wt %, 6.9 g~ca. 4.03 cc) was then added to the solution while stirring. The solution became turbid and was then heated to 90° C. and kept at 90° C. for about 0.5 hour while stirring. A clear solution was obtained. The concentrations of the resulting solution were 1059.6 g $MoO_3$/L (~7.36 mol Mo/L), 177.2 g NiO/L (~2.36 mol Ni/L), and 104.6 g $P_2O_5$/L (~1.47 mol P/L).

EXAMPLE 8

150 g (~ca. 70.67 cc) of solution described in Example 6 was placed in 100 cc glass container with a lid and heated to 90° C. while stirring. $H_3PO_4$ (aq., 85 wt %, 15.3 g~ca. 8.97 cc) was then added to the solution while stirring. The solution became turbid and was then kept at 90° C. for about 0.5 hour while stirring. A clear solution was obtained. The concentrations of the resulting solution were 994 g $MoO_3$/L (~6.90 mol Mo/L), 166.3 g NiO/L (~2.22 mol Ni/L), and 163.2 g $P_2O_5$/L (~2.30 mol P/L).

EXAMPLE 9

In 1 liter glass container, a solution was prepared by adding just enough water (ca. 250 cc) to $NiCO_3$ powder (49.08 wt %

Ni in NiCO$_3$, 135.7 g) to make a stirrable suspension. H$_3$PO$_4$ (aq., 85 wt %, 41.3 g) was then added to the suspension, followed by MoO$_3$ (100% MoO$_3$: 508.5 g) while stirring. The suspension was then heated to 92° C. and kept at 92° C. for about 1 hour while stirring. A clear solution was obtained. The final volume of the resulting solution was ca. 416 cc. The concentrations of the resulting solution were 1224 g MoO$_3$/L (~8.50 mol Mo/L), 204.7 g NiO/L (~2.73 mol Ni/L), and 61.2 g P$_2$O$_5$/L (~0.86 mol P/L).

A catalyst was formed by impregnating 50 grams of a gamma-Al$_2$O$_3$ carrier (pore volume: 0.67 mL/g (determined by H$_2$O method); surface area: 263 m$^2$/g) with 35 cc of the solution. Solution and carrier were placed in a hot cabinet of 60° C. for 1 hour prior to impregnation. Warm solution was added in three portions to the warm carrier. After each addition the material was well mixed. After all solution was added, the material was aged for 60 minutes at 60° C. while regularly mixing. After aging, the catalyst was rotary dried with cold and hot air until a final catalyst temperature of 90° C. The impregnated catalyst was then static calcined at 450° C. (temperature was increased with 10° C./min to 450° C. and kept at 450° C. for 1.5 hours). The theoretical loading of the catalyst was: molybdenum, 43.2 wt % as MoO$_3$; nickel, 7.18 wt % as NiO; phosphorus, 2.17 wt % as P$_2$O$_5$.

EXAMPLE 10

In 100 cc glass container, a solution was prepared by adding just enough water (ca. 30 cc) to CoCO$_3$ powder (45.5 wt % Co in CoCO$_3$, 14.65 g) to make a stirrable suspension. H$_3$PO$_4$ (aq., 85 wt %, 4.13 g) was then added to the suspension and the temperature was increased to 60° C. Then MoO$_3$ (100% MoO$_3$, 50.85 g) was added in small portions while stirring. The suspension was then heated to 92° C. and kept at 92° C. for about 1 hour while stirring. A clear solution was obtained. The final volume of the solution was ca. 44.3 cc. The concentrations of the resulting solution were 1149 g MoO$_3$/L (~7.98 mol Mo/L), 191.8 g CoO/L (~2.56 mol Co/L), and 57.4 g P$_2$O$_5$/L (~0.81 mol P/L).

EXAMPLE 11

In a flask, a solution was prepared by adding just enough water to NiCO$_3$ powder (49 wt % Ni in NiCO$_3$, 68.43 g) to make a stirrable suspension. H$_3$PO$_4$ (aq., 85 wt %, 29.46 g) was then added to the suspension, followed by about 40% of the MoO$_3$ (total amount of MoO$_3$: 256.05 g). The suspension was then heated at 92° C. until the suspension became more stirrable, then the remaining MoO$_3$ was added stepwise. After about 30 minutes at 92° C., a clear solution was obtained. The concentrations of the resulting solution were 1000 g MoO$_3$/L (~6.95 mol Mo/L), 166.7 g NiO/L (~2.23 mol Ni/L), and 70.8 g P$_2$O$_5$/L (~1.0 mol P/L). 137.8 g of this solution was concentrated to 1158 g MoO$_3$/L (~8.04 mol Mo/L) by evaporation of water at 50° C. applying an air flow. 12.66 g of diethylene glycol was added to this concentrated solution, giving a final solution containing 986 g MoO$_3$/L (~6.85 mol Mo/L).

A catalyst was formed by impregnating a gamma-Al$_2$O$_3$ carrier (pore volume: 0.79 mL/g (determined by H$_2$O method); surface area: 248 m$^2$/g) with the just-formed solution. The impregnated catalyst was then dried at 120° C. for 1.5 hours. The theoretical loading of the catalyst was: molybdenum, 42 wt % as MoO$_3$; nickel, 7 wt % as NiO; phosphorus, 3 wt % as P$_2$O$_5$.

This catalyst was tested in the ULSD test described above and had a relative volume activity (RVA, reaction order 1.4) HDS of 261 relative to KF-757 1.5E, a catalyst commercially available from Albemarle Catalysts BV.

EXAMPLE 12

In 100 cc glass container, a solution was prepared by adding just enough water (ca. 30 cc) to NiCO$_3$ powder (49.08 wt % Ni in NiCO$_3$, 21.67 g) to make a stirrable suspension. H$_3$PO$_4$ (aq., 85 wt %, 3.83 g), followed by 30% of citric acid (100% citric acid, total amount of citric acid: 11.67 g) were then added to the suspension while stirring. Then MoO$_3$ (100% MoO$_3$, 52.39 g) was added in small portions while stirring. The suspension was then heated to 90° C. and kept at 90° C. for about 1 hour while stirring. The obtained solution was not completely clear. The remaining citric acid was added stepwise. The suspension was then kept at 90° C. for about 1 hour while stirring. A clear solution was obtained. The final volume of the solution was ca. 54 cc. The concentrations of the resulting solution were 971 g MoO$_3$/L (~6.74 mol Mo/L), 251.6 g NiO/L (~3.36 mol Ni/L), and 43.7 g P$_2$O$_5$/L (~0.62 mol P/L).

COMPARATIVE EXAMPLE

Example 1 of US2007135300A 63.6 g of nickel carbonate (corresponding to 39.7 g of NiO), 220 g of molybdenum trioxide, and 31.5 g of ortho-phosphoric acid (purity: 85 percent, corresponding to 19.5 g of P$_2$O$_5$) were added to 250 cc of pure water, and dissolved therein with stirring at 80° C. Then, this solution was cooled to room temperature. The final volume of the solution obtained after cooling down was about 350 cc (instead of less than 250 reported in US2007135300A). The concentrations of the resulting solution were 629 g MoO$_3$/L (~4.37 mol Mo/L), 113.9 g NiO/L (~1.52 mol Ni/L), and 55.8 g P$_2$O$_5$/L (~0.79 mol P/L).

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

The invention further relates to the following items:

1. A process for forming a solution composition, which process comprises bringing together, in an aqueous medium,
   i) at least one phosphorus compound;
   ii) at least one Group VI metal compound; and
   iii) at least one Group VIII metal compound,
   such that a solution composition having a) a phosphorus concentration in the range of from about 0.40 to about 1.7 mol/l and a P:Group VI molar ratio of from about 1:6 to about 1:12 and optionally a Group VI metal concentration of more than about 5.6 mol/L; b) a Group VI metal concentration of more than 6.9 mol/L, a phosphorus concentration in the range of from about 1.1 to about 3.3 mol/l and a P:Group VI molar ratio of from about 1:3 to about 1:6; or c) a Group VI metal concentration of more than 6.9 mol/L, a phosphorus concentration in the range of from about 2.2 to about 6 mol/l and a P:Group VI molar ratio of from about 1:1 to about 1:3 is formed.

2. A process as in item 1, wherein said phosphorus compound is a water soluble, acidic phosphorus compound.

3. A process as in any of items 1 to 2, wherein said phosphorus compound is orthophosphoric acid.

4. A process as in any of items 1 to 3, wherein i) said at least one Group VI metal compound is an oxide or an oxo-acid; ii) said at least one Group VIII metal compound is an a carbonate, hydroxide, or hydroxy-carbonate; or iii) i) and ii).

5. A process as in any of items 1 to 4, wherein a non-acidic organic additive is included in forming said solution composition, which additive has at least two hydroxyl groups, and/or wherein an organic acid is included, which organic acid has at least one acid group and at least one functional group selected from a hydroxyl group and an acid group.

6. A process as in any of items 1 to 5, wherein said non-acidic organic additive is diethylene glycol, triethylene glycol, tetraethylene glycol, or polyethylene glycol.

7. A process as in any of items 1 to 6, wherein said solution composition has a Group VIII metal concentration in the range of about 1.12 mol/L to about 4.85 mol/L.

8. A process as in any of items 1-7, wherein said at least one Group VI metal compound is a) a molybdenum compound, b) a tungsten compound, or c) combinations of a) and b) and/or wherein said at least one Group VIII compound is d) a nickel compound, e) a cobalt compound, or f) combination of d) and e).

9. A process as in any of items 1-8, wherein said process further comprises removing at least a portion of said aqueous medium from said solution composition.

10. A solution composition formed as in any of items 1 to 9, which composition comprises a Group VI metal, a Group VIII metal, and phosphorus, where the composition has a phosphorus concentration in the range of from about 0.5 to about 6.0 mol/l and a P:Group VI molar ratio of from about 1:1 to about 1:12 and optionally a Group VI metal concentration of more than about 6.9 mol/L.

11. A composition comprising an aqueous medium, at least one Group VI metal, at least one Group VIII metal, and phosphorus, where the composition has a) a phosphorus concentration in the range of from about 0.4 to about 1.7 mol/l and a P:Group VI molar ratio of from about 1:6 to about 1:12 and optionally a Group VI metal concentration of more than about 5.6 mol/L; b) a Group VI metal concentration of more than 6.9 mol/L, a phosphorus concentration in the range of from about 1.1 to about 3.3 mol/l and a P:Group VI molar ratio of from about 1:3 to about 1:6; or c) a Group VI metal concentration of more than 6.9 mol/L, a phosphorus concentration in the range of from about 2.2 to about 6 mol/l and a P:Group VI molar ratio of from about 1:1 to about 1:3.

12. A composition as in item 11, wherein said composition has a) a Group VIII metal concentration in the range of about 1.12 mol/L to about 4.85 mol/L.

13. A composition as in any of items 1 to 12 further comprising a non-acidic organic additive, which additive has at least two hydroxyl groups, and/or wherein an organic acid is included, which organic acid has at least one acid group and at least one functional group selected from a hydroxyl group and an acid group.

14. A composition as in any of items 1 to 13, wherein said non-acidic organic additive is diethylene glycol, triethylene glycol, tetraethylene glycol, or polyethylene glycol, and/or wherein said organic acid is citric acid.

15. A composition as in any of items 11-14, wherein said Group VI metal is molybdenum and/or tungsten, and/or wherein said Group VIII metal is nickel and/or cobalt.

16. A composition as in any of items 11-14, wherein said Group VI metal is molybdenum, and/or wherein said Group VIII metal is cobalt and/or nickel.

17. A composition as in any of items 11-16, wherein said composition comprises a) 18 wt % to about 26 wt % of said aqueous medium, based on the total weight of the composition; b) 16 wt % to about 19 wt % of said aqueous medium, based on the total weight of the composition; or c) less than 17 wt % of said aqueous medium, based on the total weight of the composition.

18. A composition as in item 17, wherein said aqueous medium is water.

19. A process for forming a catalyst, which process comprises
I) bringing together a carrier or a substrate and an impregnation solution comprising a solution composition, wherein said solution composition comprises an aqueous medium, at least one Group VI metal, at least one Group VIII metal, and at least one phosphorus compound, wherein the solution composition is characterized by a) a phosphorus concentration in the range of from about 0.40 to about 1.7 mol/l and a P:Group VI molar ratio of from about 1:6 to about 1:12 and optionally a Group VI metal concentration of more than about 5.6 mol/L; b) a Group VI metal concentration of more than 6.9 mol/L, a phosphorus concentration in the range of from about 1.1 to about 3.3 mol/l and a P:Group VI molar ratio of from about 1:3 to about 1:6; c) a Group VI metal concentration of more than 6.9 mol/L, a phosphorus concentration in the range of from about 2.2 to about 6 mol/l and a P:Group VI molar ratio of from about 1:1 to about 1:3; or c) a phosphorus concentration in the range of from about 0.5 to about 6.00 mol/l and a P:Group VI molar ratio of from about 1:1 to about 1:12 and optionally a Group VI metal concentration of more than about 6.9 mol/L; and
II) drying the intermediate product,
to form a catalyst.

20. A process as in item 19 further comprising sulfiding the catalyst.

21. A process as in any of items 15 to 20, wherein said carrier or substrate is silica, alumina, silica-alumina, alumina with silica-alumina dispersed therein, alumina-coated silica, or silica-coated alumina, cordierite, ceramic, glass, metal, clays, magnesia, zirconia, boria, or titania.

22. A process as in any of items 19-21, wherein at least one non-acidic organic additive, which additive has at least two hydroxyl groups, is present in the impregnation solution, and/or wherein at least one organic acid having at least one acid group and at least one functional group selected from a hydroxyl group and an acid group is present in the impregnation solution.

23. A process as in any of items 19-22, wherein said additive is diethylene glycol, triethylene glycol, tetraethylene glycol, or polyethylene glycol, and/or wherein said organic acid is citric acid.

24. A process as in any of items 19-23, wherein said process comprises a single impregnation step.

25. A process as in any of items 19-24, wherein said solution composition comprises a) 18 wt % to about 26 wt % of said aqueous medium, based on the total weight of the solution composition; b) 16 wt % to about 19 wt % of said aqueous medium, based on the total weight of the solution composition; or c) less than 17 wt % of said aqueous medium, based on the total weight of the solution composition.

26. A catalyst composition formed as in any of items 19-25.

27. The catalyst according to any of items 19-26, wherein said catalyst comprises said substrate or carrier and wherein said carrier or substrate is a) impregnated with said at least one Group VI metal, at least one Group VIII metal, and said phosphorus; b) said Group VI metal, Group VIII metal, and phosphorus are present as a membrane on said carrier or substrate; or c) said Group VI metal, Group VIII metal, and phosphorus are present as a coating on said carrier or substrate.

28. A method for hydrotreating, hydrodenitrogenation, and/or hydrodesulfurization, which method comprises contacting a hydrocarbon feed and a catalyst of any of items 19 to 27.

That which is claimed is:

1. A process for forming a solution composition, which process comprises bringing together, in an aqueous medium,
   i) at least one phosphorus compound;
   ii) at least one Group VI metal compound; and
   iii) at least one Group VIII metal compound;
   such that a solution composition having a) a phosphorus concentration in the range of from about 0.40 to about 1.7 mol/l and a P:Group VI molar ratio of from about 1:6 to about 1:12 and a Group VI metal concentration of more than about 6.9 mol/L; b) a Group VI metal concentration of more than 6.9 mol/L, a phosphorus concentration in the range of from about 1.1 to about 3.3 mol/l and a P:Group VI molar ratio of from about 1:3 to about 1:6; or c) a Group VI metal concentration of more than 6.9 mol/L, a phosphorus concentration in the range of from about 2.2 to about 6 mol/l and a P:Group VI molar ratio of from about 1:1 to about 1:3 is formed.

2. A process as in claim 1, wherein said phosphorus compound is a water soluble, acidic phosphorus compound.

3. A process as in claim 1, wherein said phosphorus compound is orthophosphoric acid.

4. A process as in claim 1, wherein i) said at least one Group VI metal compound is an oxide or an oxo-acid; ii) said at least one Group VIII metal compound is a carbonate, hydroxide, or hydroxy-carbonate; or iii) i) and ii).

5. A process as in claim 1, wherein a non-acidic organic additive is included in forming said solution composition, which additive has at least two hydroxyl groups, and/or wherein an organic acid is included, which organic acid has at least one acid group and at least one functional group selected from a hydroxyl group and an acid group.

6. A process as in claim 5 wherein said non-acidic organic additive is diethylene glycol, triethylene glycol, tetraethylene glycol, or polyethylene glycol.

7. A process as in claim 1 wherein said solution composition has a Group VIII metal concentration in the range of about 1.12 mol/L to about 4.85 mol/L.

8. A process as in claim 1 wherein said at least one Group VI metal compound is a) a molybdenum compound, b) a tungsten compound, or c) combinations of a) and b) and/or wherein said at least one Group VIII compound is d) a nickel compound, e) a cobalt compound, or f) combination of d) and e).

9. A process as in claim 1 wherein said process further comprises removing at least a portion of said aqueous medium from said solution composition.

10. A composition comprising an aqueous medium, at least one Group VI metal, at least one Group VIII metal, and phosphorus, where the composition has a) a phosphorus concentration in the range of from about 0.4 to about 1.7 mol/l and a P:Group VI molar ratio of from about 1:6 to about 1:12 and a Group VI metal concentration of more than about 6.9 mol/L; b) a Group VI metal concentration of more than 6.9 mol/L, a phosphorus concentration in the range of from about 1.1 to about 3.3 mol/l and a P:Group VI molar ratio of from about 1:3 to about 1:6; or c) a Group VI metal concentration of more than 6.9 mol/L, a phosphorus concentration in the range of from about 2.2 to about 6 mol/l and a P:Group VI molar ratio of from about 1:1 to about 1:3.

11. A composition as in claim 10 wherein said composition has a) a Group VIII metal concentration in the range of about 1.12 mol/L to about 4.85 mol/L.

12. A composition as in claim 11 further comprising a non-acidic organic additive, which additive has at least two hydroxyl groups, and/or wherein an organic acid is included, which organic acid has at least one acid group and at least one functional group selected from a hydroxyl group and an acid group.

13. A composition as in claim 12 wherein said non-acidic organic additive is diethylene glycol, triethylene glycol, tetraethylene glycol, or polyethylene glycol, and/or wherein said organic acid is citric acid.

14. A composition as in claim 10 wherein said Group VI metal is molybdenum and/or tungsten, and/or wherein said Group VIII metal is nickel and/or cobalt.

15. A composition as in claim 10 wherein said Group VI metal is molybdenum, and/or wherein said Group VIII metal is cobalt and/or nickel.

16. A composition as in claim 10 wherein said composition comprises a) 18 wt % to about 26 wt % of said aqueous medium, based on the total weight of the composition; b) 16 wt % to about 19 wt % of said aqueous medium, based on the total weight of the composition; or c) less than 17 wt % of said aqueous medium, based on the total weight of the composition.

17. A composition as in claim 16 wherein said aqueous medium is water.

18. A process for forming a catalyst, which process comprises
   I) bringing together a carrier or a substrate and an impregnation solution comprising a solution composition, wherein said solution composition comprises an aqueous medium, at least one Group VI metal, at least one Group VIII metal, and at least one phosphorus compound, wherein the solution composition is characterized by a) a phosphorus concentration in the range of from about 0.40 to about 1.7 mol/l and a P:Group VI molar ratio of from about 1:6 to about 1:12 and a Group VI metal concentration of more than about 6.9 mol/L; b) a Group VI metal concentration of more than 6.9 mol/L, a phosphorus concentration in the range of from about 1.1 to about 3.3 mol/l and a P:Group VI molar ratio of from about 1:3 to about 1:6; c) a Group VI metal concentration of more than 6.9 mol/L, a phosphorus concentration in the range of from about 2.2 to about 6 mol/l and a P:Group VI molar ratio of from about 1:1 to about 1:3; or d) a phosphorus concentration in the range of from about 0.5 to about 6.00 mol/l and a P:Group VI molar ratio of from about 1:1 to about 1:12 and Group VI metal concentration of more than about 6.9 mol/L; and II) drying the impregnated carrier or substrate, to form a catalyst.

19. A process as in claim 18 further comprising sulfiding the catalyst.

20. A process as in claim 18 wherein said carrier or substrate is silica, alumina, silica-alumina, alumina with silica-alumina dispersed therein, alumina-coated silica, or silica-coated alumina, cordierite, ceramic, glass, metal, clays, magnesia, zirconia, boria, or titania.

21. A process as in claim 18 wherein at least one non-acidic organic additive, which additive has at least two hydroxyl groups, is present in the impregnation solution, and/or wherein at least one organic acid having at least one acid group and at least one functional group selected from a hydroxyl group and an acid group is present in the impregnation solution.

22. A process as in claim 21 wherein said additive is diethylene glycol, triethylene glycol, tetraethylene glycol, or polyethylene glycol, and/or wherein said organic acid is citric acid.

23. A process as in claim 18 wherein said process comprises a single impregnation step.

24. A process as in claim 18 wherein said solution composition comprises a) 18 wt % to about 26 wt % of said aqueous medium, based on the total weight of the solution composition; b) 16 wt % to about 19 wt % of said aqueous medium, based on the total weight of the solution composition; or c) less than 17 wt % of said aqueous medium, based on the total weight of the solution composition.

\* \* \* \* \*